United States Patent Office 2,749,339
Patented June 5, 1956

2,749,339
MERCURIAL DIURETICS AND METHOD OF PREPARATION THEREOF

Richard H. Barry, Bloomfield, Su Ming Wang, East Orange, and Lewis A. Walter, Madison, N. J., assignors to Wallace & Tiernan Incorporated, a corporation of Delaware No Drawing. Application June 8, 1953, Serial No. 360,387

7 Claims. (Cl. 260—242)

This invention relates to the preparation of a new compound which is primarily useful as a diuretic.

In the past various compounds and drugs have been used or suggested for use as diuretics. These have included certain xanthine derivatives, such as theobromine and theophylline and mixtures of these compounds and their salts with other substances. The diuretic potency of these combinations in oral doses that are well tolerated usually is much too low. The effective diuretics are organic mercurials, parenterally administered, either alone or in combination with theophylline. Such compounds when given orally are ineffective or excessively irritating or both.

One object of this invention is to provide a compound which will be more effective as a diuretic so that it will be useful in relatively small dosages and may be taken orally without excessive gastric irritation or other undesirable effects.

Another object of this invention is to provide compounds of the general character above referred to containing mercury without introducing the difficulties and irritations which are usually associated with the use of mercury as a diuretic. It has been found that a new and useful composition of matter may be produced by the use of a complex calcium salt of theobromine and N-(β-methoxy-γ-hydroxymercuripropyl)-2-pyridone-5-carboxylic acid.

Another new and useful composition of matter may be produced by the use of a complex salt prepared from calcium theobromine and calcium N-(β-methoxy-γ-theophylline-mercuripropyl)-2-pyridone-5-carboxylate.

Both of these complex salts are useful as orally administered diuretics.

The following are examples of methods for the preparation of a composition embodying our invention although it is not intended to limit the invention to the particular examples given.

Example I

Calcium oxide (164 grams) and theobromine (540 grams) was added to twenty liters of water and the mixture was heated to 80° C., with stirring, in an atmosphere free of carbon dioxide. To this mixture was added 431 grams of N-(β-methoxy-γ-hydroxymercuripropyl)-2-pyridone-5-carboxylic acid and the stirring was continued at 80° C. for twenty minutes. The hot mixture was filtered free of insoluble material and on cooling the filtered solution the desired complex salt precipitated. It was filtered off and washed with a litle cold water. This salt was suitable for use but could be further purified by recrystallization from water under conditions which avoided the presence of carbon dioxide.

The compound is a hydrate which loses water on heating. At temperatures above 100° C. the dehydrated salt decomposes without melting sharply. The compound is a distinct chemical entity and is not a mixture since the complex salt of the same composition is obtained even though the relative proportions of the organic ingredients are varied in its preparation. Microscopic examination shows the hydrated salt to be uniform needle-like crystals. Most of the water in this hydrated salt may be removed by drying in vacuo at 100°. The partially dehydrated salt is hygroscopic.

The hydrated salt contains calcium, mercury and theobromine in the proportions of 1 to 1, to 2. We believe the formula of this complex salt to be:

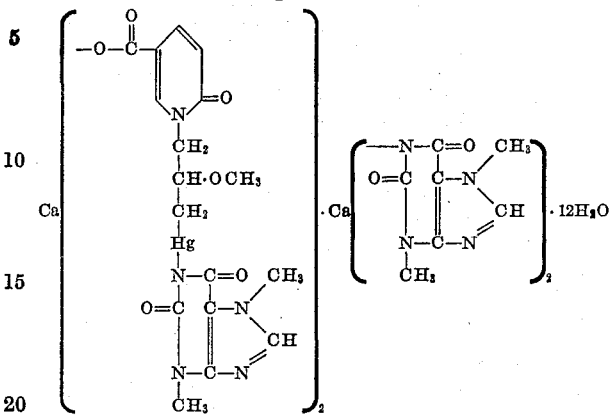

Analysis calculated for the above formula:

|  | Per cent |
|---|---|
| Calcium | 4.37 |
| Theobromine | 39.30 |
| Mercury | 21.89 |

Analysis found:

|  |  |
|---|---|
| Calcium | 4.30 |
| Theobromine | 41.20 |
| Mercury | 21.84 |

Example II

To calcium oxide (15 grams) suspended in one liter of water, 118 grams of N-(β-methoxy-γ-theophylline-mercuripropyl)-2-pyridone-5-carboxylic acid was added. The mixture was stirred and heated at 80° C. for a few minutes and then filtered. This filtered solution was added to a hot filtered solution of calcium theobromine prepared by dissolving 36 grams of theobromine in a suspension of 15 grams of calcium oxide in 500 ml. of water at 80° C. On cooling the crystalline complex salt separated as a hydrate and was filtered off and washed with a little cold water. This salt was recrystallized from water. Microscopic examination showed it to be an homogeneous crystalline powder. Probable formula:

Analysis calculated for the above formula:

|  | Per cent |
|---|---|
| Calcium | 4.29 |
| Mercury | 21.46 |
| Xanthine (Theophylline+Theobromine) | 38.32 |

Analysis found:

|  |  |
|---|---|
| Calcium | 4.40 |
| Mercury | 21.40 |
| Xanthine (Theophylline+Theobromine) | 37.32 |

The N - (β - methoxy - γ - theophylline - mercuripropyl)-2-pyridone-5-carboxylic acid is obtained by dissolving one equivalent of sodium hydroxide, one of N-(β-methoxy-γ - hydroxymercuripropyl) - 2 - pyridone - 5 - carboxylic acid and one equivalent of theophylline in water. This solution is then acidified with one equivalent of acetic acid and the desired compound precipitates.

The specific proportions given are intended to be illustrative and the terms used in describing and claiming the invention have been used in their descriptive sense and not as terms of limitation and it is intended that all equivalents of the terms used be included within the scope of the appended claims.

We claim:

1. A new composition of matter, comprising the complex calcium salt of N-(β-methoxy-γ-theobromine mercuripropyl)-2-pyridone-5-carboxylic acid and theobromine.

2. A new composition of matter, comprising the complex salt of N-(β-methoxy-γ-theophylline mercuripropyl)-2-pyridone-5-carboxylic acid and theobromine.

3. A new composition of matter, comprising the complex calcium salt of N-(β-methoxy-γ-theobromine mercuripropyl) - 2 - pyridone - 5 - carboxylic acid, theobromine and water of hydration.

4. A new composition of matter, comprising the complex calcium salt of N-(β-methoxy-γ-theophylline mercuripropyl) - 2 - pyridone - 5 - carboxylic acid, theobromine and water of hydration.

5. A compound having the formula:

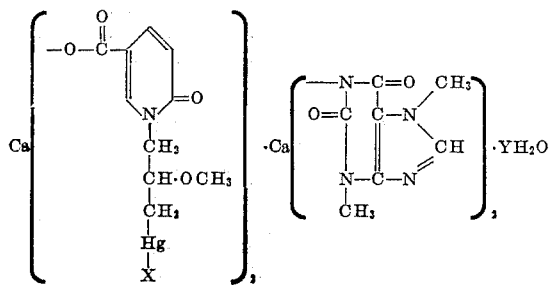

wherein X is a xanthine derivative selected from the group consisting of theobromine and theophylline and Y is 12 and 14 when X is theobromine and theophylline respectively.

6. The method of preparing a diuretic salt, containing calcium, mercury and theobromide in the mol proportions of 1:1:2 respectively, comprising the steps of adding 164 grams of calcium oxide and 540 grams of theobromine to 20 liters of water, heating the mixture to 80° C., with stirring in an atmosphere free of carbon dioxide, adding to the aforesaid mixture 431 grams of N-(β-methoxy-γ-hydroxymercuripropyl) - 2 - pyridone - 5 - carboxylic acid and continuing stirring while holding the temperature at 80° C. for twenty minutes, filtering off the insolubles and cooling to precipitate said diuretic salt, the weights and volumes given indicating proportions of the stated materials.

7. The method of preparing a diuretic salt, containing calcium, mercury, theophylline and theobromine in the mol proportion of 1:1:1:1 respectively, comprising the steps of suspending in one liter of water 15 grams of calcium oxide, adding thereto 118 grams of N-(β-methoxy-γ - theophylline - mercuripropyl) - 2-pyridone - 5 - carboxylic acid, heating the mixture to 80° C. while stirring the mixture, and then filtering it to remove insolubles and to prepare a first filtrate, separately preparing a solution of calcium theobromine by dissolving 36 grams of theobromine in a suspension of 15 grams of calcium oxide in 500 ml. of water at 80° C. and filtering out any insoluble material to prepare a second filtrate, adding together said first and said second filtrates, cooling the mixed filtrates to crystallize out said diuretic salt as a hydrate, and washing the crystallized salt in water, the weights and volumes given indicating proportions of the stated materials.

References Cited in the file of this patent
UNITED STATES PATENTS
1,547,698    Vieth _____ July 28, 1925